US011373637B2

(12) United States Patent
Chen

(10) Patent No.: US 11,373,637 B2
(45) Date of Patent: Jun. 28, 2022

(54) PROCESSING SYSTEM AND VOICE DETECTION METHOD

(71) Applicant: Realtek Semiconductor Corporation, Hsinchu (TW)

(72) Inventor: Ching-Lung Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 292 days.

(21) Appl. No.: 16/585,108

(22) Filed: Sep. 27, 2019

(65) Prior Publication Data
US 2020/0219485 A1 Jul. 9, 2020

(30) Foreign Application Priority Data
Jan. 3, 2019 (TW) .................................. 108100246

(51) Int. Cl.
G10L 15/08 (2006.01)
G06F 3/16 (2006.01)
G10L 15/22 (2006.01)

(52) U.S. Cl.
CPC .............. *G10L 15/08* (2013.01); *G06F 3/167* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 9,478,234 | B1* | 10/2016 | Nandy | G10L 25/48 |
| 9,818,407 | B1* | 11/2017 | Seeker-Walker | G10L 25/78 |
| 10,192,546 | B1* | 1/2019 | Piersol | G10L 17/22 |
| 10,332,543 | B1* | 6/2019 | Zopf | G10L 15/28 |
| 10,777,189 | B1* | 9/2020 | Fu | G10L 15/22 |

(Continued)

FOREIGN PATENT DOCUMENTS

| CN | 105869655 A | 8/2016 |
| CN | 108352168 A | 7/2018 |

OTHER PUBLICATIONS

China Patent Office, Office Action of the corresponding Chinese application No. 201910011390.5 dated Mar. 31, 2021.

*Primary Examiner* — Jonathan C Kim
(74) *Attorney, Agent, or Firm* — Locke Lord LLP; Tim Tingkang Xia, Esq.

(57) ABSTRACT

A processing system operates in a first power domain and includes a first memory, a memory access circuit, and a first processing circuit. The first memory stores sound data detected by a microphone. The memory access circuit transfers the sound data to a second memory according to a first command, in order to store the sound data as voice data. The first processing circuit outputs a second command according to a human voice detection signal. The second command is for enabling a second processing circuit, in order to determine whether the voice data in the second memory matches a predetermined voice command. One of the first and the second processing circuits outputs the first command. The second processing circuit operates in a second power domain. A power consumption to which the first power domain corresponds is lower than a power consumption to which the second power domain corresponds.

18 Claims, 5 Drawing Sheets

(56) References Cited

U.S. PATENT DOCUMENTS

| | | | |
|---|---|---|---|
| 2002/0116186 A1* | 8/2002 | Strauss | G10L 25/78 704/E11.003 |
| 2014/0122078 A1* | 5/2014 | Joshi | G06F 1/324 704/251 |
| 2014/0163978 A1* | 6/2014 | Basye | G10L 15/28 704/233 |
| 2014/0222436 A1* | 8/2014 | Binder | G10L 15/22 704/275 |
| 2014/0257821 A1* | 9/2014 | Adams | G10L 25/48 704/275 |
| 2014/0281628 A1* | 9/2014 | Nigam | G06F 1/3206 713/323 |
| 2015/0106085 A1* | 4/2015 | Lindahl | G10L 15/32 704/231 |
| 2015/0302855 A1* | 10/2015 | Kim | G10L 15/22 704/275 |
| 2015/0340032 A1* | 11/2015 | Gruenstein | G06N 3/08 704/232 |
| 2016/0066113 A1* | 3/2016 | Elkhatib | G06F 1/3215 381/56 |
| 2016/0125877 A1* | 5/2016 | Foerster | G10L 17/18 704/254 |
| 2016/0232899 A1* | 8/2016 | Chen | G10L 15/22 |
| 2016/0253997 A1* | 9/2016 | Kerr | G10L 15/28 381/110 |
| 2016/0322045 A1* | 11/2016 | Hatfield | G10L 15/22 |
| 2017/0148444 A1* | 5/2017 | Booklet | G10L 15/01 |
| 2017/0162205 A1* | 6/2017 | Melvin | G10L 25/78 |
| 2017/0270919 A1* | 9/2017 | Parthasarathi | G10L 25/87 |
| 2018/0025732 A1* | 1/2018 | Lepauloux | G10L 25/81 704/210 |
| 2018/0144740 A1* | 5/2018 | Laroche | G10L 15/22 |
| 2018/0174583 A1* | 6/2018 | Zhao | G10L 25/84 |
| 2018/0249246 A1* | 8/2018 | Kjems | H04R 3/005 |
| 2018/0293974 A1* | 10/2018 | Georges | G10L 15/183 |
| 2018/0317019 A1* | 11/2018 | Fürst | H04R 3/00 |
| 2018/0322871 A1* | 11/2018 | Chuang | G10L 25/84 |
| 2018/0324518 A1* | 11/2018 | Dusan | G10L 25/78 |
| 2018/0350357 A1* | 12/2018 | Pandey | G10L 25/84 |
| 2019/0043488 A1* | 2/2019 | Booklet | G10L 15/22 |
| 2019/0147887 A1* | 5/2019 | Lesso | G10L 25/45 704/246 |
| 2019/0214002 A1* | 7/2019 | Park | G10L 15/30 |
| 2019/0214022 A1* | 7/2019 | Vaquero Avilés-Casco et al. | G10L 17/00 |
| 2019/0228778 A1* | 7/2019 | Lesso | G10L 17/00 |
| 2019/0266996 A1* | 8/2019 | Lesso | G10L 15/08 |
| 2019/0295544 A1* | 9/2019 | Garcia | G06F 3/167 |
| 2020/0035243 A1* | 1/2020 | Guo | G10L 15/22 |
| 2020/0066268 A1* | 2/2020 | Erell | H04R 3/005 |
| 2020/0075028 A1* | 3/2020 | Lesso | G10L 17/00 |
| 2020/0117417 A1* | 4/2020 | Bowler, II | G10L 15/28 |
| 2020/0201970 A1* | 6/2020 | Lesso | G10L 17/06 |
| 2020/0219485 A1* | 7/2020 | Chen | G10L 15/08 |
| 2021/0158817 A1* | 5/2021 | Wang | G10L 15/22 |
| 2021/0225363 A1* | 7/2021 | Iwase | G10L 15/065 |

* cited by examiner

PROCESSING SYSTEM AND VOICE DETECTION METHOD

RELATED APPLICATIONS

This application claims priority to Taiwan Application Serial Number 108100246, filed Jan. 3, 2019, which is herein incorporated by reference in its entirety.

BACKGROUND

Technical Field

The present disclosure relates to a processing system. More particularly, the present disclosure relates to a processing system and a voice detection method in a device that provides a voice wake-up function.

Description of Related Art

A number of electronic devices that support a voice wake-up function is growing. In current approaches, an additional digital processing circuit is required to analyze a voice command. As a result, the device cost and the overall power consumption are increased, resulting in a failure of complying with related energy requirements.

SUMMARY

Some aspects of the present disclosure are to provide a processing system that operates in a first power domain and includes a first memory, a memory access circuit, and a first processing circuit. The first memory stores sound data detected by a microphone. The memory access circuit transfers the sound data to a second memory according to a first command, in order to store the sound data as voice data. The first processing circuit outputs a second command according to a human voice detection signal. The second command is for enabling a second processing circuit, in order to determine whether the voice data in the second memory matches a predetermined voice command. One of the first processing circuit and the second processing circuit outputs the first command. The second processing circuit operates in a second power domain. A power consumption to which the first power domain corresponds is lower than a power consumption to which the second power domain corresponds.

Some aspects of the present disclosure are to provide to a voice detection method that includes the following operations: storing, by a first memory, sound data detected by a microphone; transferring the sound data to a second memory according to a first command, in order to store the sound data as voice data; and outputting, by a first processing circuit, a second command according to a human voice detection signal. The second command is for enabling a second processing circuit, in order to determine whether the voice data in the second memory matches a predetermined voice command. One of the first processing circuit and the second processing circuit outputs the first command. The first memory and the first processing circuit operate in a first power domain. The second processing circuit operates in a second power domain, and a power consumption to which the first power domain corresponds is lower than a power consumption to which the second power domain corresponds.

As described above, the processing system and the voice detection method in the embodiments of the present disclosure may cooperate with a low power core processing circuit in the device to achieve the function of voice wake-up. As a result, a better balance between the device cost and the average power consumption can be achieved, and the current energy requirements can be met at the same time.

DETAILED DESCRIPTION

The following embodiments are disclosed with accompanying diagrams for detailed description. It should be understood that details of practice disclosed herein do not intend to limit the present disclosure. For simplifying the drawings, some of the conventional structures are shown with schematic illustrations.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
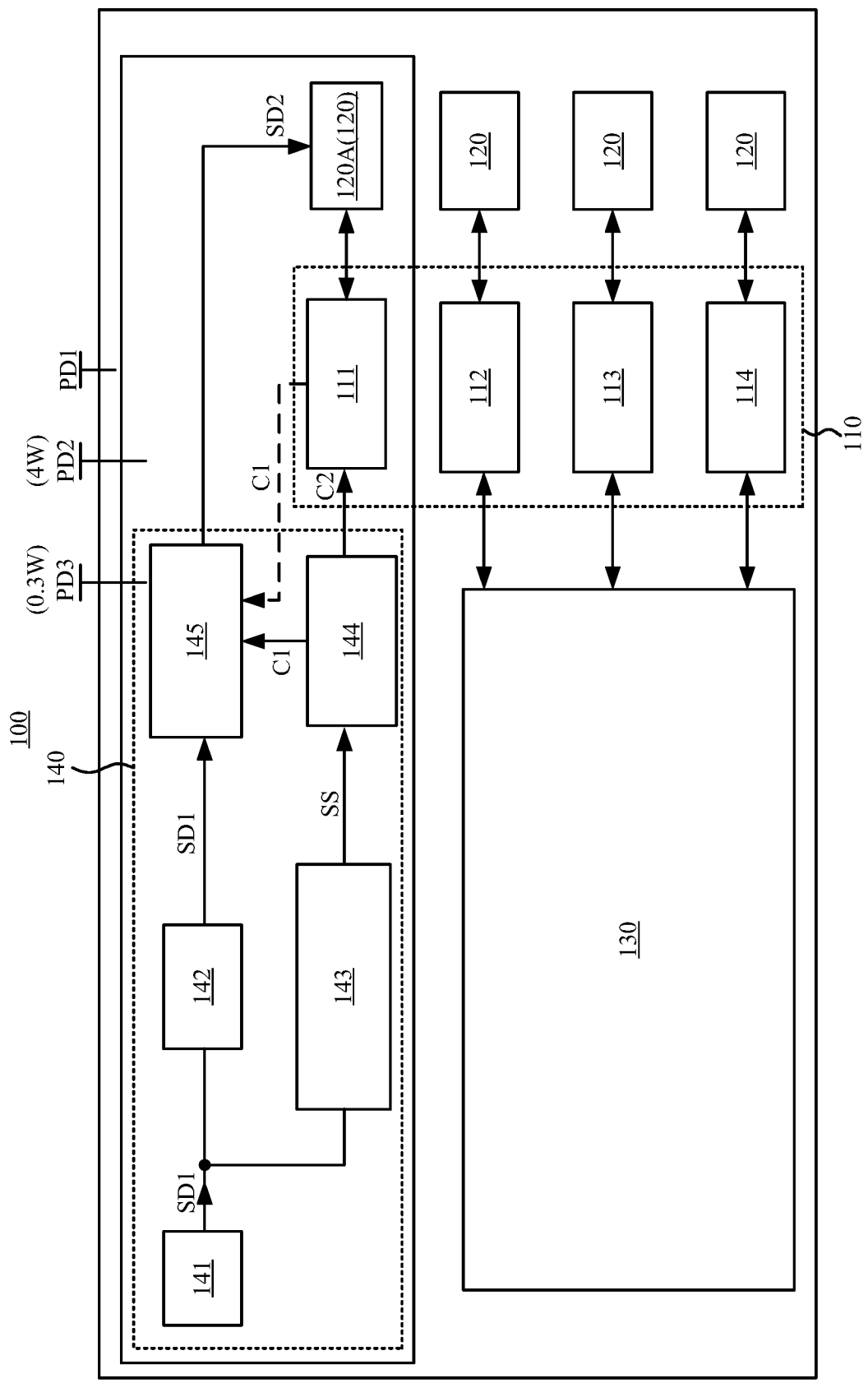
FIG. 1 is a schematic diagram of an electronic device according to some embodiments of the present disclosure.

FIG. 1 is a schematic diagram of an electronic device 100 according to some embodiments of the present disclosure. In some embodiments, the electronic device 100 may be a television, but the present disclosure is not limited thereto. In some embodiments, the electronic device 100 includes a main processor 110, memories 120, an audio/video (AV) processing circuit 130, and a processing system 140.

The main processor 110 is a multi-core processor that includes core processing circuits 111-114. The core processing circuits 111-114 are respectively coupled to the memories 120 and are coupled to the AV processing circuit 130. In some embodiments, the memories 120 may be implemented with dynamic random access memories (DRAMs), but the present disclosure is not limited thereto.

In some embodiments, the AV processing circuit 130 may perform operations of AV codec, scaling, dynamic compensation, etc., to a video (not shown) provided from an external source. The core processing circuits 111-114, the memories 120, and the AV processing circuit 130 may cooperate with each other, in order to play the received video.

In some embodiments, the processing system 140 is activated in a standby mode, and is configured to determine whether to enable the core processing circuit 111 according to an external sound signal, in order to perform a boot operation. In other words, the electronic device 100 supports a voice wake-up function. For example, if human voice is detected in an environment, the processing system 140 may enable the core processing circuit to determine whether the human voice is a predetermined command. If the human voice is the predetermined command, other core processing circuits 112-114 are enabled to perform the boot operation.

The processing system 140 includes a microphone 141, a memory 142, a voice activity detection (VAD) circuit 143, a processing circuit 144, and a memory access circuit 145. The microphone 141 is configured to detect sound data SD1. In some embodiments, the microphone 141 may be implemented with digital microphones. Various suitable sound receiver components to implement the microphone 141 are within the contemplated scope of the present disclosure.

The memory 142 is coupled to the microphone 141, in order to receive and to store the sound data SD1. In some embodiments, the memory 142 may be formed with a static random access memory (SRAM).

The VAD circuit 143 is coupled to the microphone 141, in order to determine whether information of human voice is present in the sound data SD1. For example, the VAD circuit 143 may analyze information of energy, tone, etc., carried in the sound data SD1, in order to determine whether the information of human voice is present. If the information of human voice is determined to be present, the VAD circuit 143 outputs a human voice detection signal SS. In some embodiments, the VAD circuit 143 may be implemented with a voice recognition chip. Alternatively, in some embodiments, the VAD circuit 143 may be implemented with a processing circuit that performs various voice recognition algorithms.

The processing circuit 144 is coupled to the VAD circuit 143, in order to receive the human voice detection signal SS. In some embodiments, the processing circuit 144 outputs a command C1 and a command C2 according to the human voice detection signal SS, in which the command C1 is for enabling the memory access circuit 145, and the command C2 is for enabling the core processing circuit 111. In some embodiments, the processing circuit 144 may be implemented with a microcontroller circuit that has lower power consumption. For example, the processing circuit 144 may be implemented with an 8051 microcontroller, but the present disclosure is not limited thereto. Various microcontrollers are within the contemplated scope of the present disclosure.

The memory access circuit 145 is coupled to the processing circuit 144, the memory 142, and one memory 120 (labeled as 120A) of the memories 120. In some embodiments, the memory access circuit 145 transfers the sound data SD1 in the memory 142 to the memory 120A according to the command C1, in order to store the same as voice data SD2. The core processing circuit 111 may be enabled based on the command C2, in order to activate the memory 120A.

In other words, in some embodiments, when the VAD circuit 143 determines that the human voice is present, the core processing circuit 111 and the memory 120A are enabled in response to the command C2, and the memory access circuit 145 is enabled in response to the command C1, in order to transfer and store the sound data SD1 that has information of human voice as the voice data SD2. Accordingly, the core processing circuit 111 may determine whether the voice data SD2 matches a predetermined voice command, in order to determine whether to wake up the remaining memories 120 and the remaining core processing circuit 112-114 to perform the boot operation.

In some embodiments, the memory access circuit 145 may be implemented with a direct memory access (DMA) controller circuit, but the present disclosure is not limited thereto.

In some embodiments, as shown in FIG. 1, the core processing circuit 111 operates in a power domain PD2. In some embodiments, the memory 120A operates in the power domain PD2. The remaining memories 120 and the remaining core processing circuits 112-114 operate in a power domain PD1. The processing system 140 operates in a power domain PD3. In general, in order to perform the above video operation(s), the circuits that operate in the power domain PD1 lead to higher power consumption. Moreover, the processing system 140 that operates in the power domain PD3 is configured to receive the voice command in the standby mode, and thus leads to the lowest power consumption. The memory 120A and the core processing circuit 111 are configured to determine whether the voice command matches the predetermined voice command according to the control of the processing system 140. Accordingly, the power consumption corresponding to the power domain PD1 is higher than that corresponding to the power domain PD2, and the power consumption corresponding to the power domain PD2 is higher than that corresponding to the power domain PD3. In a non-limiting example, as shown in FIG. 1, the power consumption corresponding to the power domain PD2 may be about 4 watts (W), and the power consumption corresponding to the power domain PD3 may be about 0.3 W.

In some approaches, additional digital signal processing circuit(s) is utilized to detect the voice command. In these approaches, the additional digital signal processing circuit(s) leads to higher cost of the hardware and to higher power consumption, resulting in a failure to comply with energy requirements in each country.

Compared with the above approaches, the processing system 140 in the embodiments of the present disclosure utilizes the memory 142 and the processing circuit 144 to operate as a buffer to receive the sound data, in which the memory 142 and the processing circuit 144 have lower power consumption. As a result, when the sound data is determined to have information of human voice, the lower power core processing circuit 111 of the electronic device 100 is enabled to determine whether the received human voice is the predetermined voice command. With this configuration, a better balance is achieved between the device cost and the average power consumption, and the current energy requirements are met at the same time.

In some embodiments, the core processing circuit 111 may output the command C1 (e.g., as shown by dotted line in FIG. 1). In greater detail, when the human voice is detected, the VAD circuit 143 outputs the human voice detection signal SS. Then, the processing circuit 144 generates the command C2, in order to enable the core processing circuit 111. Thus, the core processing circuit 111 outputs the command C1 to enable the memory access circuit 145. In the above configuration, a better balance is also achieved between the device cost and the average power consumption, and the current energy requirements are also met at the same time.

Figure 2:
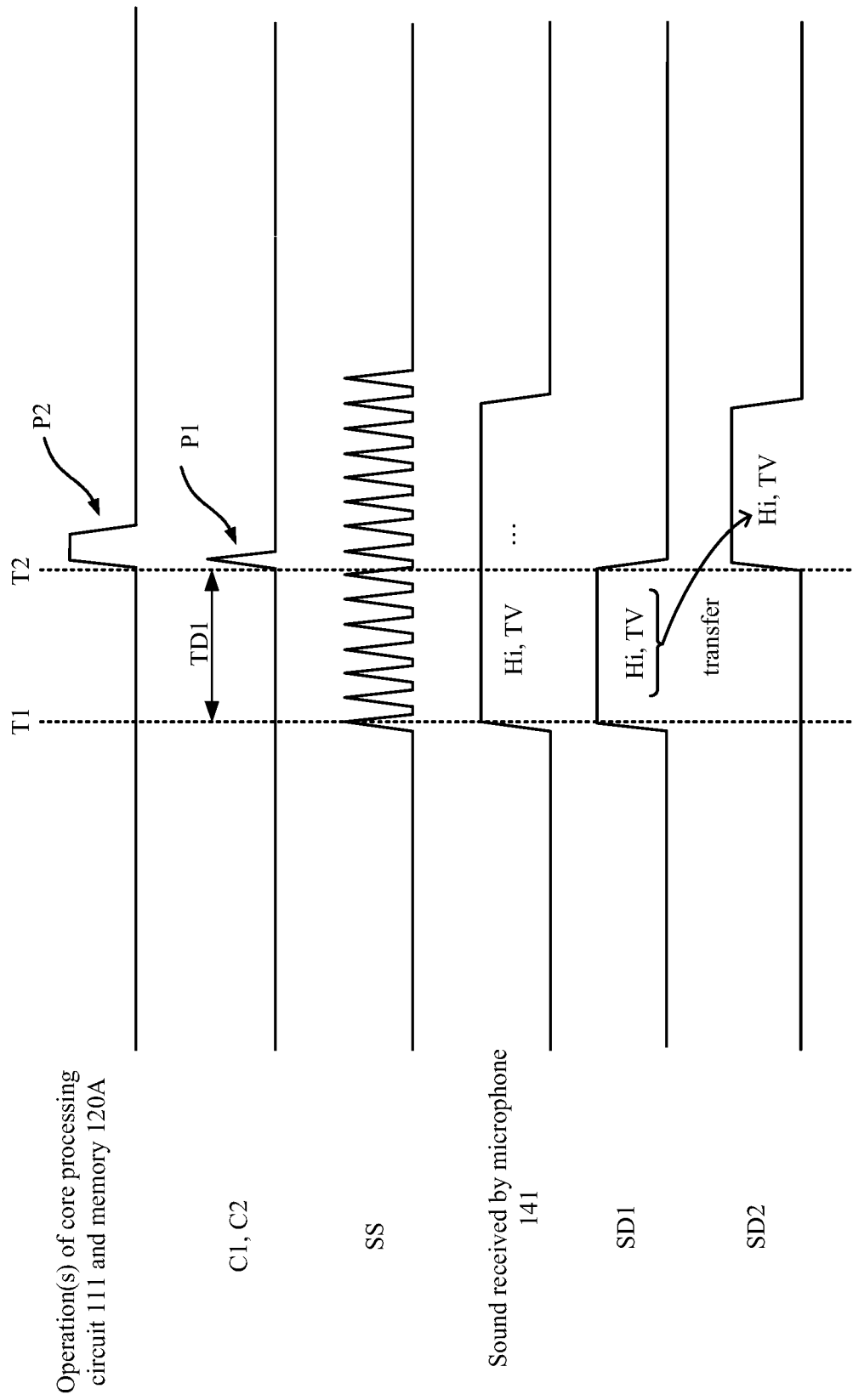
FIG. 2 is a schematic diagram illustrating waveforms of various data, signals, and/or commands in FIG. 1 according to some embodiments of the present disclosure.

FIG. 2 is a schematic diagram illustrating waveforms of various data, signals, and/or commands in FIG. 1 according to some embodiments of the present disclosure.

As shown in FIG. 2, at time T1, the microphone 141 detects an external sound, and generates the sound data SD1. For example, the microphone 141 detects that a user issues a voice command of "Hi, TV" to the electronic device 100.

Meanwhile, the VAD circuit 143 determines that the information of human voice is present in the sound data SD1, and outputs the human voice detection signal SS. In addition, at time T1, the memory 142 stores the sound data SD1.

At time T2, the processing circuit 144 outputs the command C1 and the command C2 (indicated as a pulse P1). In response to the command C2, the core processing circuit 111 and the memory 120A are enabled (indicated as a pulse P2). Meanwhile, in response to the command C1, the memory access circuit 145 is enabled (i.e., pulse P1), in order to transfer the sound data SD1 to the memory 120A and store the same as the voice data SD2.

Accordingly, the core processing circuit 111 may analyze the voice data SD2, in order to determine whether the voice data SD2 matches the predetermined voice command (i.e., operation(s) to which pulse P2 corresponds). For example, if the predetermined voice command is "Hi, TV," in this example, the core processing circuit 111 determines that the voice data SD2 matches the predetermined voice command, and then wakes up other circuits in the power domain PD1 to perform the boot operation.

In some embodiments, a predetermined delay time TD1 is configured to be between the time T1 and the time T2. As shown in FIG. 2, when the processing circuit 144 receives the human voice detection signal SS at time T1, the processing circuit 144 outputs the command C1 the command C2 after the predetermined delay time TD1 (i.e., at the time T2). In some embodiments, the predetermined delay time TD1 may be set according to keywords of the predetermined voice command. For example, if the keywords of the predetermined voice command are "Hi, TV," and it generally takes about one second for a user to speak "Hi, TV," the predetermined voice command may be set as about one second. With the configuration of the predetermined delay time TD1, the core processing circuit 111 and the memory 120A are able to enabled after the received sound data SD1 is assured to be sufficient to reflect the predetermined voice command. As a result, the average power consumption can be further reduced. The value of the predetermined delay time TD1 is given for illustrative purposes, and the present disclosure is not limited thereto.

Figure 3:
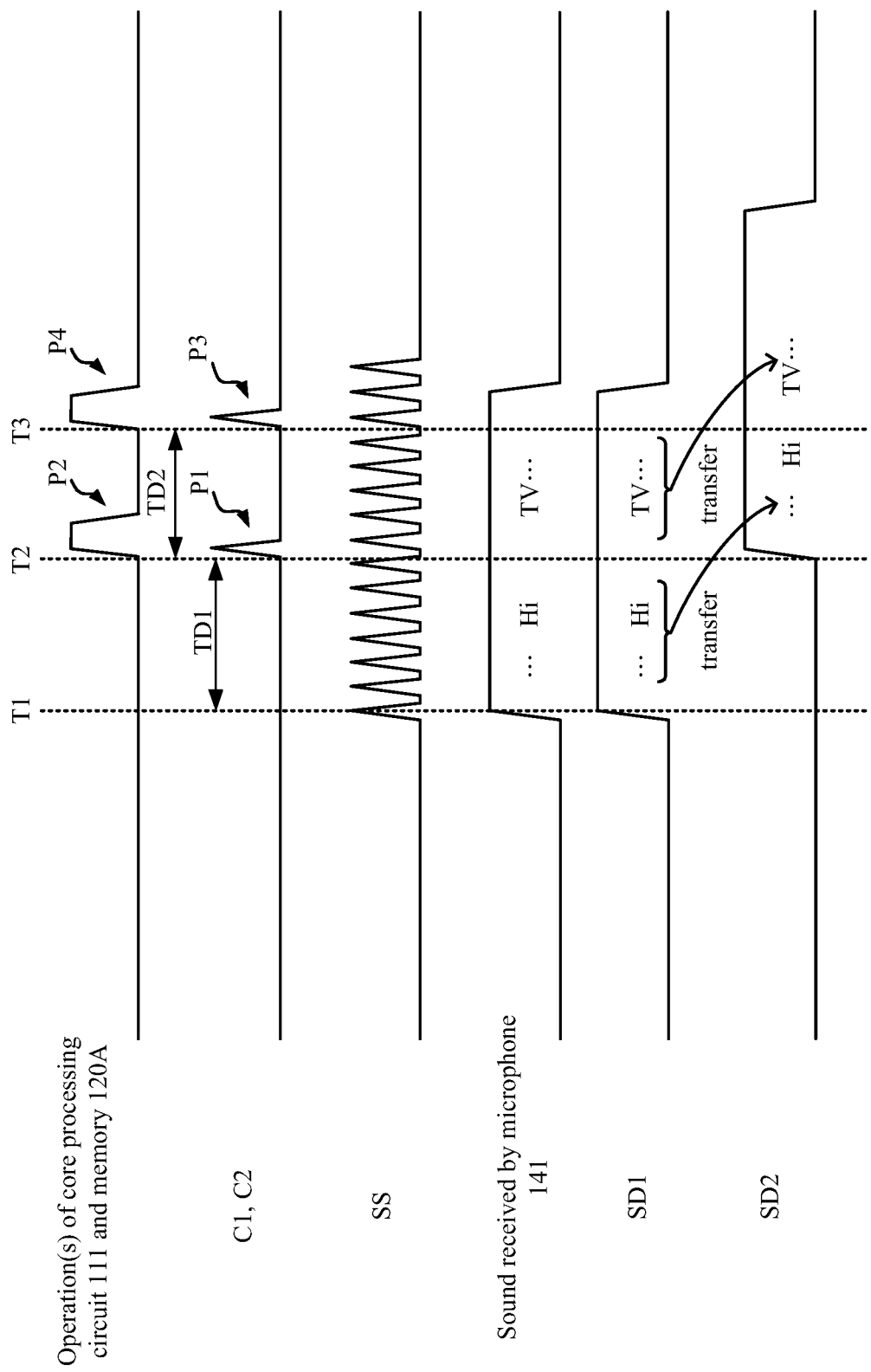
FIG. 3 is a schematic diagram illustrating various data, signals, and/or commands in FIG. 1, according to some other embodiments of the present disclosure.
Figure 4:
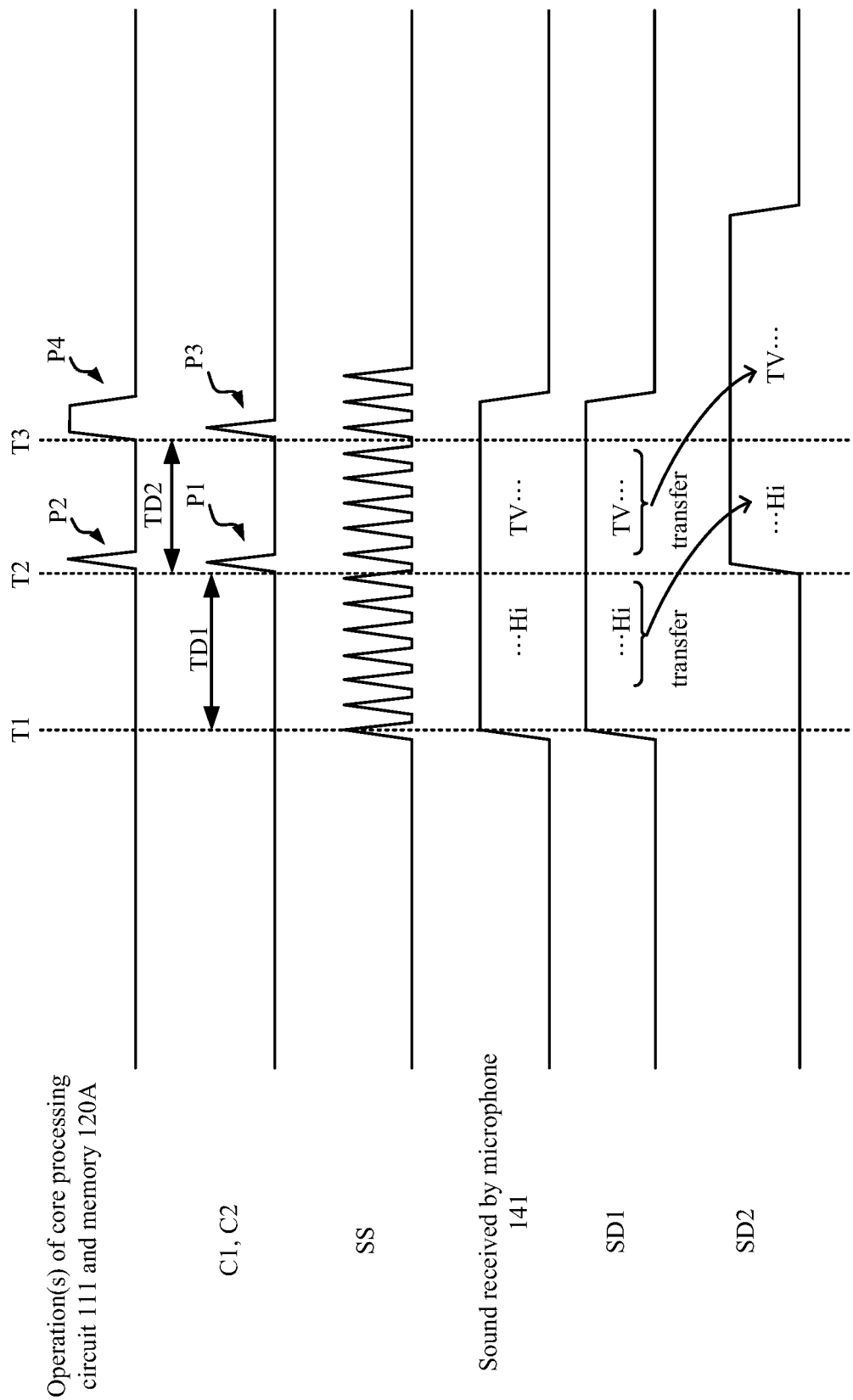
FIG. 4 is a schematic diagram illustrating various data, signals, and/or commands in FIG. 1, according to some yet other embodiments of the present disclosure.

In some embodiments, when the predetermined voice command includes two or more keywords (e.g., "Hi" and "TV"), the core processing circuit 111 may be enabled at least once, in order to perform subsequent operation(s). For example, as shown in FIG. 2, the core processing circuit 111 is enabled once (i.e., pulse P1) to perform the subsequent operation(s). Alternatively, in some embodiments, as shown in FIGS. 3 and 4, the core processing circuit 111 is enabled at least twice (i.e., pulses P1 and P3) to perform the subsequent operation(s). A predetermined delay time TD2 is present between the times when the core processing circuit 111 is successively enabled twice.

FIG. 3 is a schematic diagram illustrating various data, signals, and/or commands in FIG. 1, according to some other embodiments of the present disclosure.

As shown in FIG. 3, similar to FIG. 2, at time T1, the microphone 141 generates the sound data SD1. For example, the microphone 141 detects that a user says "Hi" to the electronic device 100. Meanwhile, the VAD circuit 143 determines that the sound data SD1 includes information of human voice and outputs the human voice detection signal SS, and the memory 142 stores the sound data SD1.

At time T2, the processing circuit 144 outputs the command C1 and the command C2 (i.e., pulse P1). In response to the command C2, the core processing circuit 111 and the memory 120A are enabled (i.e., pulse P2). In response to the command C1, the memory access circuit 145 transfers the sound data SD1 to the memory 120A, and store the same as the voice data SD2. Accordingly, the core processing circuit 111 is able to analyze the voice data SD2, and determines that the voice data SD2 includes the information of the keyword "Hi" (i.e., pulse P2). Afterwards, the core processing circuit 111 and the memory 120A re-enter to the standby mode (i.e., a time interval between the pulses P2 and P4).

In this example, in the above progress, the user continuously issues the voice command to the electronic device 100. For example, the microphone 141 detects that the user continuously says "TV." Therefore, similar to the above operations, the memory 142 continuously stores the sound data SD1, and the VAD circuit 143 outputs the human voice detection signal SS again. At time T3, the processing circuit 144 outputs the command C1 and the command C2 (i.e., pulse P3) again, in order to enable the memory access circuit 145 and core processing circuit 111 to transfer the current sound data SD1 to the memory 120A.

Accordingly, the core processing 111 is able to analyze the voice data SD2, and thus determines that the voice data SD2 includes the information of keyword of "TV" (i.e., pulse P4). As a result, the core processing circuit 111 may find two keywords of "Hi" and "TV," in order to wake up other circuits in the power domain PD1 to perform the boot operation.

FIG. 4 is a schematic diagram illustrating various data, signals, and/or commands in FIG. 1, according to some yet other embodiments of the present disclosure.

In the example of FIG. 4, at time T2, the core processing circuit 111 and the memory access circuit 145 are enabled, in order to transfer the sound data SD1 to the memory 120A, and to store the same as the voice data SD2 without determining whether the voice data SD2 matches the predetermined voice command (i.e., pulse P2). At time T3, the core processing circuit 111 and the memory access circuit 145 are enabled again, in order to transfer the current sound data SD1 to the memory 120A. Accordingly, the core processing circuit 111 is able to analyze the voice data SD2, and to determine that the voice data SD2 includes information of two keywords of "Hi" and "TV" (i.e., pulse P4). As a result, the core processing circuit 111 determines that the voice data SD2 matches the predetermined voice command, in order to wake up other circuits in the power domain PD1 to perform the boot operation.

In other words, compared with FIG. 3, in this example, when the core processing circuit 111 is enabled at the first time, the core processing circuit 111 may take a shorter operating cycle (i.e., pulse P2) to transfer the sound data SD1 as the voice data SD2. Then, the core processing circuit 111 is enabled again to analyze the voice data SD2 to determine whether to perform the boot operation. With this configuration, compared to embodiments of FIG. 2, the memory 142 may only store the sound data SD1 that has a smaller data size. Therefore, the memory 142 may be implemented with a SRAM having low capacity, in order to save the cost of the device.

In greater detail, in some embodiments, as shown in FIG. 4, when the processing circuit 144 receives the first human voice detection signal SS at time T1, the processing circuit 144 only outputs the command C1 (i.e., pulse P1) at time T2, in order to enable the memory access circuit 145 to transfer the current sound data SD1 to the memory 120A (i.e., pulse P2). Then, the processing circuit 144 outputs the command C1 and the command C2 (i.e., pulse P3) at time T3. As a result, not only the memory access circuit 145 is enable to transfer the sound data SD1, but also the core processing circuit 111 is enabled to analyze the voice data SD2 stored at time T2 and time T3 (i.e., pulse P4), in order to determine whether to perform the boot operation. In other words, when the core processing circuit 111 is enabled by the command C2 at the first time, the memory access circuit 145 is enabled by the command C1 at least twice.

In some embodiments, the predetermined delay times TD1 and TD2 may be set by a user. In some embodiments, the values of the predetermined delay times of TD1 and TD2 may be the same or different. For example, the predetermined delay times of TD1 and TD2 may be respectively set to about 0.5 second and 0.5 second, or to about 0.5 second and 0.7 second.

For ease of illustrating, the examples where the processing circuit 144 outputs the command C1 are given in FIGS. 2-4. As mentioned above, in some other embodiments, the command C1 may be outputted by the core processing circuit 111. In these embodiments, operation(s), to which pulse P1 or P3 in FIGS. 2-4 corresponds, include as follows: The processing circuit 144 generates the command C2 to enable the core processing circuit 111 at first. The core processing circuit 111 then outputs the command C1 to enable the memory access circuit 145.

Figure 5:
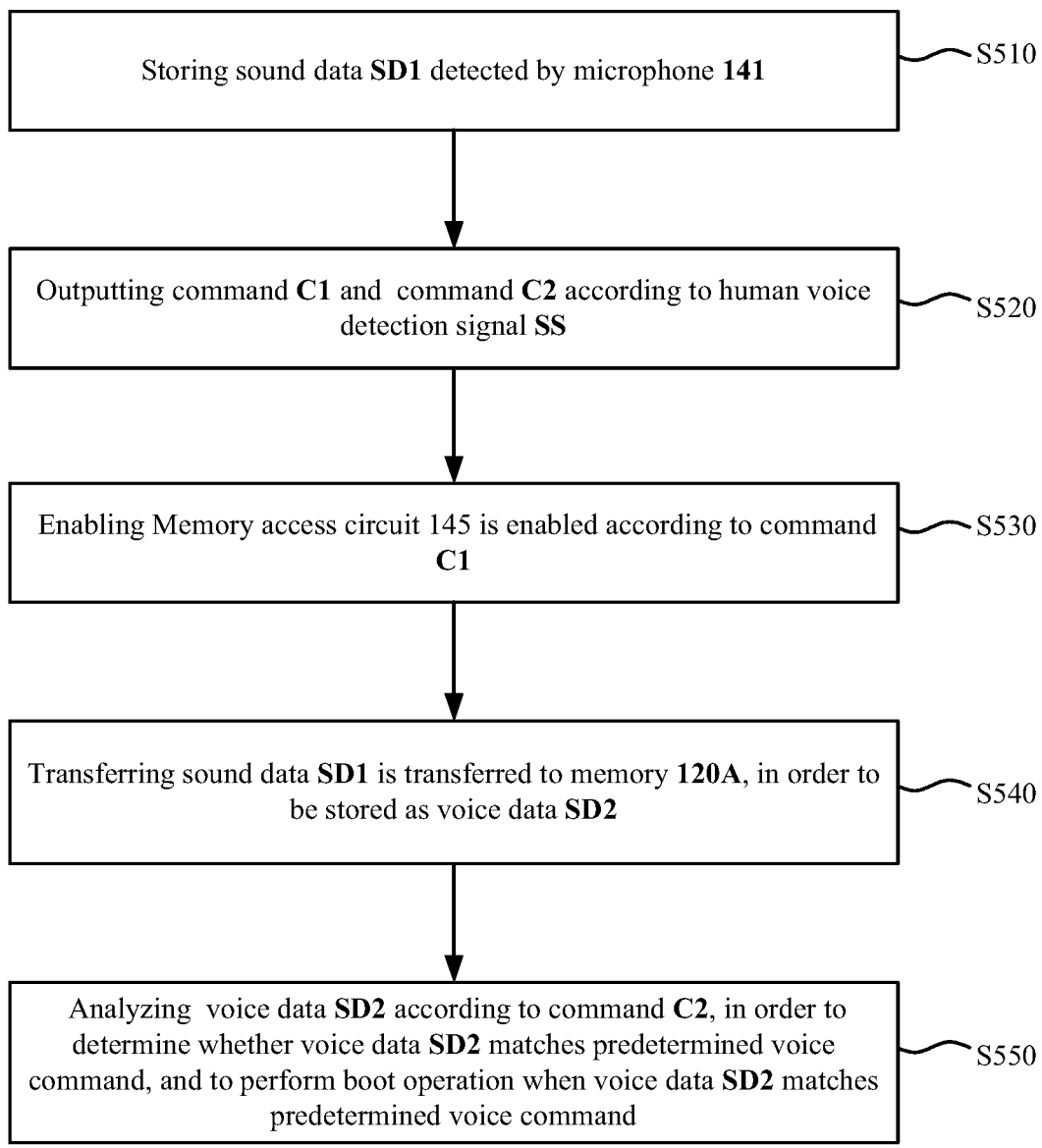
FIG. 5 is a flow chart of a voice detection method according to some embodiments of the present disclosure.

FIG. 5 is a flow chart of a voice detection method 500 according to some embodiments of the present disclosure.

In operation S510, the sound data SD1 detected by the microphone 141 is stored.

In operation S520, the command C1 and the command C2 are outputted according to the human voice detection signal SS.

In operation S530, the memory access circuit 145 is enabled according to the command C1.

In operation S540, the sound data SD1 is transferred to the memory 120A, in order to be stored as the voice data SD2.

In operation S550, the voice data SD2 is analyzed according to the command C2, in order to determine whether the voice data SD2 matches the predetermined voice command, and to perform the boot operation when the voice data SD2 matches the predetermined voice command.

The above operations may be understood with reference to embodiments in FIGS. 1-4, and thus the repetitious descriptions are not given. The above description of the voice detection method 500 includes exemplary operations, but the operations of the voice detection method 500 are not necessarily performed in the order described above. The order of the operations of the voice detection method 500 can be changed, or the operations can be executed simultaneously or partially simultaneously as appropriate, in accordance with the spirit and scope of various embodiments of the present disclosure.

In various embodiments, the processing system 140 may be implemented with software, hardware, and/or firmware. For example, various circuits in the processing system 140 may be integrated into an application-specific integrated circuit. In some embodiments, the processing system 140 may be implemented with software performing the voice detection method 500. In some embodiments, various circuits or units in the processing system 140 may be implemented with the cooperation of software, hardware, and firmware.

As described above, the processing system and the voice detection method in the embodiments of the present disclosure may cooperate with a low power core processing circuit in the device to achieve the function of voice wake-up. As a result, the better balance is achieved between the device cost and the average power consumption while complying with the current energy requirements.

It will be apparent to those skilled in the art that various modifications and variations can be made to the structure of the present disclosure without departing from the scope or spirit of the disclosure. It is intended that the present disclosure cover modifications and variations of this disclosure provided they fall within the scope of the following claims.

What is claimed is:

1. A processing system comprising:
a first memory operating in a first power domain and configured to store sound data detected by a microphone;
a memory access circuit operating in the first power domain and configured to transfer the sound data to a second memory according to a first command, in order to store the sound data as voice data; and
a first processing circuit operating in the first power domain and configured to output a second command to enable a second processing circuit when the sound data has information of human voice,
wherein the second processing circuit operates in a second power domain and is coupled between the first processing circuit and the second memory, and a power consumption to which the first power domain corresponds is lower than a power consumption to which the second power domain corresponds,
wherein the first command is outputted from one of the first processing circuit and the second processing circuit,
wherein when the second processing circuit is first enabled by the second command, the second processing circuit is not configured to determine whether the voice data matches a predetermined voice command,
wherein when second processing circuit is enabled by the second command again, the second processing circuit is configured to determine whether the voice data matches the predetermined voice command.

2. The processing system of claim 1, further comprising:
a voice activity detection circuit configured to determine whether the information of human voice is present in the sound data, wherein when the information of human voice is determined to be present, the voice activity detection circuit outputs a human voice detection signal.

3. The processing system of claim 2, wherein when the first processing circuit receives the human voice detection signal, the one of the first processing circuit and the second processing circuit is configured to output the first command after a predetermined delay time.

4. The processing system of claim 2, wherein when the first processing circuit receives the human voice detection signal, the first processing circuit is configured to output the second command after a predetermined delay time.

5. The processing system of claim 1, wherein the first processing circuit outputs the first command, the predetermined voice command comprises a plurality of keywords, and the second processing circuit is configured to determine whether the voice data comprises the plurality of keywords when the second processing circuit is configured to determine whether the voice data matches the predetermined voice command.

6. The processing system of claim 1, wherein a predetermined delay time is present between times when the second processing circuit is successively enabled twice.

7. The processing system of claim 1, wherein when the second processing circuit is first enabled by the second command, the memory access circuit is enabled by the first command at least twice.

8. The processing system of claim 1, wherein the first memory is a static random access memory, and the second memory is a dynamic random access memory.

9. The processing system of claim 1, wherein the second processing circuit is a single core processing circuit of a multi-core processor.

10. A voice detection method, comprising:
storing, by a first memory, sound data detected by a microphone;
transferring the sound data to a second memory according to a first command, in order to store the sound data as voice data; and
outputting, by a first processing circuit, a second command to enable a second processing circuit when the sound data has information of human voice, wherein the first memory and the first processing circuit are configured to operate in a first power domain,
wherein the second processing circuit operates in a second power domain and is coupled between the first processing circuit and the second memory, and a power consumption to which the first power domain corresponds is lower than a power consumption to which the second power domain corresponds,
wherein the first command is outputted from one of the first processing circuit and the second processing circuit,
wherein when the second processing circuit is first enabled by the second command, the second processing circuit is not configured to determine whether the voice data matches a predetermined voice command,
wherein when second processing circuit is enabled by the second command again, the second processing circuit is configured to determine whether the voice data matches the predetermined voice command.

11. The voice detection method of claim 10, wherein the first processing circuit outputs the first command, the predetermined voice command comprises a plurality of keywords, and the second processing circuit is configured to determine whether the voice data comprises the plurality of keywords when the second processing circuit is configured to determine whether the voice data matches the predetermined voice command.

12. The voice detection method of claim 10, wherein a predetermined delay time is present between times when the second processing circuit is successively enabled twice.

13. The voice detection method of claim 10, wherein the sound data is transferred to the second memory by a memory access circuit, and when the second processing circuit is first enabled by the second command, the memory access circuit is enabled by the first command at least twice.

14. The voice detection method of claim 10, wherein when the first processing circuit receives a human voice detection signal, the one of the first processing circuit and the second processing circuit is configured to output the first command after a predetermined delay time.

15. The voice detection method of claim 10, wherein outputting the second command comprises:
outputting, by the first processing circuit, the second command after a predetermined delay time when the first processing circuit receives a human voice detection signal.

16. The voice detection method of claim 10, wherein the first memory is a static random access memory, and the second memory is a dynamic random access memory.

17. The voice detection method of claim 10, wherein the second processing circuit is a single core processing circuit of a multi-core processor.

18. The voice detection method of claim 10, further comprising:
determining, by a voice activity detection circuit, whether the information of human voice is present in the sound data; and
outputting, by the voice activity detection circuit, a human voice detection signal when the information of human voice is determined to be present.

* * * * *